United States Patent
Blum et al.

(10) Patent No.: US 8,547,393 B1
(45) Date of Patent: Oct. 1, 2013

(54) COLORSPACE CONVERSION BASED ON AMBIENT LIGHT DETECTION

(71) Applicant: Marvell International Ltd., Hamilton (BM)

(72) Inventors: Daniel Blum, Corvallis, OR (US); Gregory F. Carlson, Corvallis, OR (US); Keith Austin Prickett, Corvallis, OR (US); William F. Dabelstein, Salem, OR (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/786,253

(22) Filed: Mar. 5, 2013

Related U.S. Application Data

(63) Continuation of application No. 12/545,398, filed on Aug. 21, 2009, now Pat. No. 8,395,640.

(60) Provisional application No. 61/095,482, filed on Sep. 9, 2008.

(51) Int. Cl.
 *G09G 5/02* (2006.01)

(52) U.S. Cl.
 USPC .................... 345/604; 358/1.9; 358/518

(58) Field of Classification Search
 USPC ................ 345/600–604; 358/1.9, 518–523
 See application file for complete search history.

(56) References Cited

U.S. PATENT DOCUMENTS

| | | |
|---|---|---|
| 2007/0058184 A1 | 3/2007 | Kodama |
| 2007/0058186 A1 | 3/2007 | Tanaka |
| 2010/0289835 A1* | 11/2010 | Holub ........................... 345/690 |

* cited by examiner

*Primary Examiner* — Eric A Rust

(57) ABSTRACT

Embodiments provide methods, apparatus, and systems for environmental lighting compensation in imaging devices. Environmental characteristics, including ambient light, may be accounted for in order to optimize an output.

16 Claims, 4 Drawing Sheets

COLORSPACE CONVERSION BASED ON AMBIENT LIGHT DETECTION

CROSS REFERENCE TO RELATED APPLICATIONS

The present disclosure is a continuation of and claims priority to U.S. patent application Ser. No. 12/545,398, filed Aug. 21, 2009, now U.S. Pat. No. 8,395,640, issued Mar. 12, 2013, which claims priority to U.S. Provisional Patent Application No. 61/095,482, filed Sep. 9, 2008, which are incorporated herein by reference.

TECHNICAL FIELD

Embodiments herein relate to the field of imaging devices, and, more specifically, to imaging devices configured to compensate for environmental lighting conditions.

BACKGROUND

Typically, imaging devices, such as printers, facsimile machines, scanners, etc., utilize colormaps to transform images or data from one colorspace into another. For example, an image received from a computing device may be translated from an RGB (Red, Green, Blue) colorspace to a CMYK (Cyan, Magenta, Yellow, Black) colorspace prior to its output. During a translation, a colormap may be designed to account for a number of factors including print head transfer functions, ink properties, and paper types. Even when taking these factors into account, however, images may not be optimized for viewing because colormaps may fail to account for a viewer's perception.

Human perception of images may be dependent upon environmental lighting conditions such as ambient lighting. For example, images may appear brighter and with different hue and saturation as ambient lighting increases in luminance and as chromaticity varies. Consequently, the appearance of a color may be relative to its environment. Current imaging devices often contain a set of predefined colormaps that are designed to account for numerous factors. These colormaps, however, typically fail to account for lighting conditions and other environmental variables.

SUMMARY OF THE DISCLOSURE

In various embodiments, the present disclosure provides a method comprising receiving, by an imaging device, light data that includes information pertaining to an ambient light condition; determining a colormap, based on the received light data, that is configured to compensate for the ambient light condition; and converting a received input colorspace, which is associated with data to be output by the imaging device, into an output colorspace based on the determined colormap.

In various embodiments, the receiving may comprise receiving a measured illuminant from one or more sensors configured to determine a tristimulus coordinate space. The illuminant value may comprise one or more tristimulus coordinates.

In various embodiments, the determining may comprise determining an adjustment factor by comparing a white point of a default colormap with the light data and generating the colormap by adjusting one or more entries of the default colormap with the adjustment factor. In other embodiments, the determining may comprise determining a weight value for each of a plurality of pre-generated colormaps that are each generated with a different illuminant value, and selecting the colormap from the plurality of pre-generated colormaps based on the weight values. In other embodiments, the determining may comprise determining a weight value for each of a plurality of pre-generated colormaps, wherein the plurality of pre-generated colormaps are each generated with a different illuminant value, and generating the colormap by calculating a linear combination of the weight value for each of the plurality of pre-generated colormaps.

In various embodiments, the present disclosure provides an article of manufacture comprising a computer readable medium having computer-readable instructions stored thereon that, if executed by an apparatus, configure the apparatus to receive light data that includes information that pertains to an ambient light condition, determining a colormap, based on the received light data, that is configured to compensate for the ambient light condition, and convert a received input colorspace into an output colorspace based on the determined colormap, the received input colorspace being associated with data to be output by the apparatus.

In various embodiments, computer-readable instructions, if executed by the apparatus, may further configure the apparatus to determine an adjustment factor by comparing a white point of a default colormap with the light data, and generate the colormap by adjusting one or more entries of the default colormap with the adjustment factor.

In various embodiments, computer-readable instructions, if executed by the apparatus, may further configure the apparatus to determine a determine a weight value for each of a plurality of pre-generated colormaps that are each generated with a different illuminant value, and select the colormap from the plurality of pre-generated colormaps based on the weight values.

In various embodiments, computer-readable instructions, if executed by the apparatus, may further configure the apparatus to determine a weight value for each of a plurality of pre-generated colormaps that are each generated with a different illuminant value and generate the colormap by calculating a linear combination of the weight value for each of the plurality of pre-generated colormaps.

In various embodiments, the present disclosure provides an apparatus that comprises a light sensor configured to determine an amount of ambient light, a memory coupled to the light sensor that is configured to store one or more colormaps generated with different illuminant values, and a colormap compensation unit coupled to the memory that is configured to determine an effective colormap, based on the amount of ambient light and the one or more colormaps.

In various embodiments, the apparatus may further comprise an output block coupled to the colormap compensation unit that is configured to convert a received input colorspace into an output colorspace based on the effective colormap. In other embodiments, the colormap compensation unit may be further configured to determine an adjustment factor and generate an effective colormap by adjusting one or more entries of one of the one or more colormaps with the adjustment factor. In other embodiments, the colormap compensation unit may be further configured to determine a weight value for each of the one or more colormaps, each having different illumination value, and select the effective colormap from the one or more colormaps based on the weight value. In other embodiments, the colormap compensation unit may be further configured to determine a weight value for each of the one or more colormaps and generate the effective colormap based on a linear combination of the weight values for each of the one or more colormaps.

In various embodiments, the apparatus may comprise a user interface coupled to the memory and configured to receive data relating to the ambient light. In various embodiments a user may utilize the user interface to provide data relating to the ambient light.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope of this disclosure. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent or that each discrete operation is required for all embodiments.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

The description may use the terms "embodiment" or "embodiments," which may each refer to one or more of the same or different embodiments. Furthermore, the terms "comprising," "including," "having," and the like, as used with respect to embodiments, are synonymous.

In various embodiments, methods, apparatuses, articles of manufacture, and systems for ambient lighting compensation are provided. In exemplary embodiments, an imaging device may receive light data that includes information pertaining to ambient lighting conditions. Based on the light data, the imaging device may determine an appropriate colormap for converting a received colorspace into a desired output colorspace, wherein the input colorspace is associated with data to be output by the imaging device. In various embodiments, the desired output colorspace may compensate for the ambient lighting conditions, and consequently, facilitate production of an optimized image or output.

Figure 1:
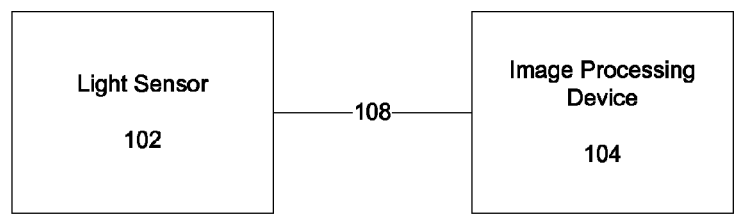
FIG. 1 illustrates a system block diagram of an imaging device, in accordance with various embodiments.

Referring to FIG. 1, an example system block diagram, including an imaging device 104 and a light sensor 102, is illustrated in accordance with various embodiments. In FIG. 1, the imaging device 104 is coupled to the light sensor 102 via a communication link 108. Image processing device 104 may be configured to receive light data from the light sensor 102. The light data may include information that pertains to an ambient light condition associated with the environment of the light sensor 102 and/or the imaging device 104. The imaging device 104 may utilize the light data to compensate for one or more environmental conditions in order to optimize an output.

In various embodiments, imaging device 104 may be a device capable of receiving and outputting data. For example, imaging device 104 may be one of a facsimile machine, a printer, a scanner, a digital camera, a handheld computing device, a Liquid Crystal Display ("LCD"), and a multi-functional peripheral. The invention is not to be limited in this regard. Throughout the remainder of the specification, the Applicants may refer to either a print device or an imaging device for ease of understanding. The Applicants note that the teachings of the present disclosure are not meant to be limited to a particular device.

In various embodiments, the imaging device 104 may receive light data via communication link 108. Communication link 108 may be a wireless connection or a wired connection. In one example, communication link 108 may be a wireless link capable of operation in accordance with one or more wireless communication protocols including but not limited to WLAN protocols, Bluetooth, Ultra Wideband (UWB) and radio frequency identification (RFID). In another embodiment, light sensor 102 may be wired to the imaging device 104 via one or more cables or connections, or alternatively, may be integral to the imaging device. The invention is not to be limited in this regard.

In various other embodiments, the imaging device 104 may receive light data via a user interface. In one example, a user may manually enter values for light data. The values may be read from one or more light sources and may be entered directly into the imaging device 104 or alternatively into a host coupled to the imaging device 104, for example a host computer.

In accordance with various embodiments, light sensor 102 may determine light data associated with its environment. Light data may include information that pertains to an ambient light condition. The information may be an illuminant value that represents a white point of colors viewed in the environmental lighting conditions. The illuminant value may be defined by a tristimulus coordinate, such as CIE 1931. CIE 1931, as known in the art, is a colorspace which defines a color based on a set of tristimulus values, typically called X, Y, and Z, which may roughly correspond to red, green, and blue. Other forms of light data are also contemplated.

Figure 2:
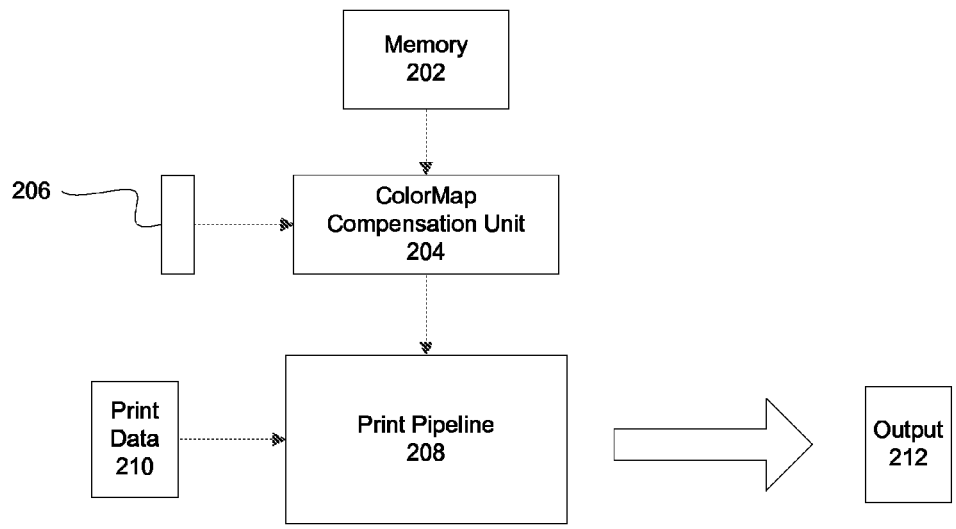
FIG. 2 illustrates a system block diagram of an imaging device, in accordance with various embodiments.

FIG. 2 illustrates a system block diagram, in accordance with various embodiments of the present disclosure. FIG. 2 illustrates a light sensor 206, a memory 202 configured to store at least one colormap, a colormap compensation unit 204, and an output block. In various embodiments, an output block may be a print pipeline 208. The print pipeline 208 may be configured to receive print data 210 and a colormap from the colormap compensation unit 204 to facilitate production of an output 212. The print pipeline 208 may include one or more elements configured to output an image or output raster, for example, an ink pipeline and a print head. The invention is not to be limited in this regard as more or fewer components may be utilized without deviating from the teachings of the disclosure. Additionally, various components may be integrated into a single housing, such as a printer or alternatively, may be external to an imaging device and merely coupled to the device via one or more connections.

In various embodiments, the light sensor 206 may determine light data including an amount of ambient light. For example, the light sensor 206 may measure an illuminant. Light sensor 206 may be implemented utilizing a photodiode for each tristimulus coordinate. The light sensor 206 may convert the results to a digital domain for use by the colormap compensation unit 204 via an analog-to-digital (A/D) converter. The light sensor 206 may measure ambient light that reflects off of a print media, such as paper, or may measure an amount of ambient light in another manner. Light sensor 206 may provide the light data to an imaging device's computational core, for example, the colormap compensation unit 204, or alternatively may transmit the light data to a memory 202 for storage.

In various embodiments, colormap compensation unit 204 may comprise a general purpose processor or an application specific integrated circuit (ASIC). Colormap compensation unit 204 may execute instructions stored in memory or embedded in firmware, as will be discussed further herein. The colormap compensation unit 204 may be configured to determine an effective colormap based on an amount of ambient light and one or more colormaps. The effective colormap may be configured to compensate for the ambient light condition. Colormap compensation unit 204 may receive the light data, which may include an amount of ambient light, from light sensor 206. In various embodiments, colormap compensation unit 204 may also receive one or more default colormaps stored in memory 202. Colormap compensation unit 204 receives the light data, compensates for the light data, and outputs an effective colormap to be used in converting the input colorspace to an output colorspace. The output colorspace may be optimized for one or more environmental conditions. Colormap compensation unit 204 may determine, select, or generate an effective colormap using a translation method, an indexing method, or an interpolation method.

Colormap compensation unit 204 may provide an effective colormap to print pipeline 208, in accordance with various embodiments. Print pipeline 208 may receive both the effective colormap and print data 210. Print pipeline 208 may convert an input colorspace associated with the print data 210 into an output colorspace to be output based at least in part on the effective colormap. The print pipeline 208 may then produce output 212 based on the output colorspace. Output 212 may be optimized for the environment.

Figure 3:
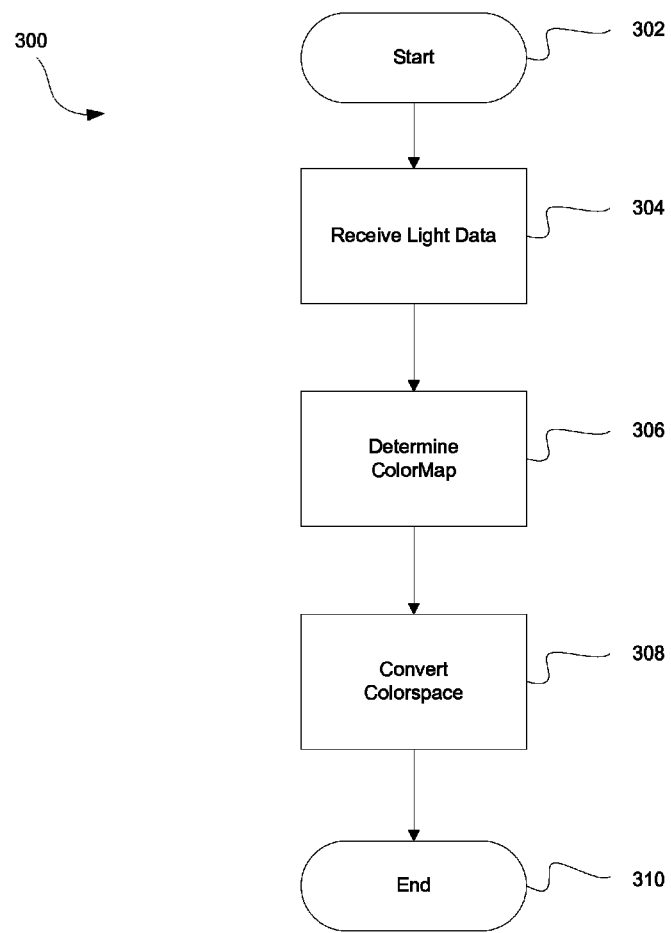
FIG. 3 is a flowchart illustrating a colorspace conversion method carried out by an imaging device, in accordance with various embodiments.
Figure 4:
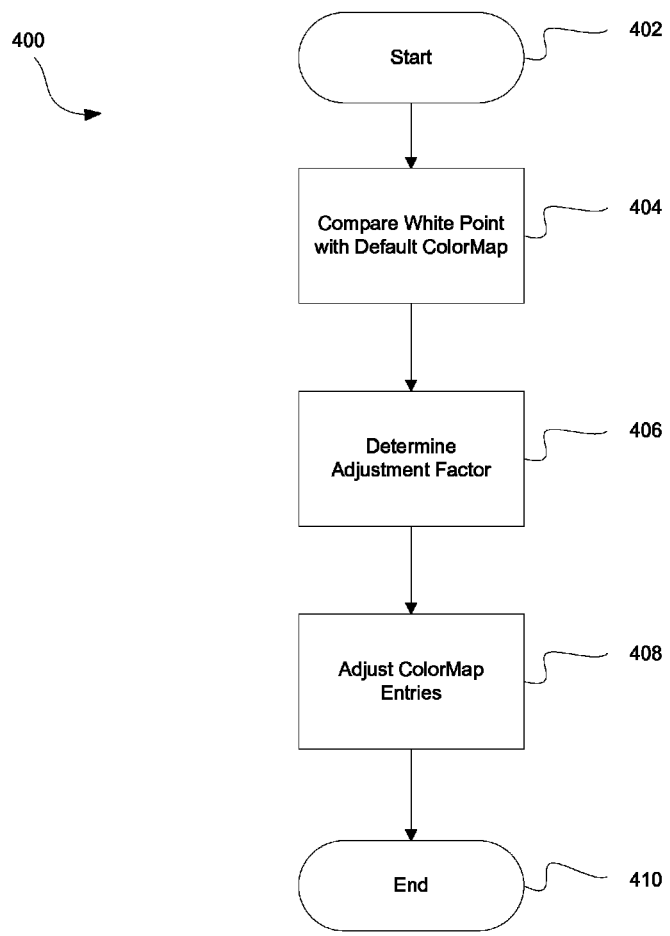
FIG. 4 is a flowchart illustrating a method of determining a colormap for colorspace conversion, in accordance with various embodiments.
Figure 5:
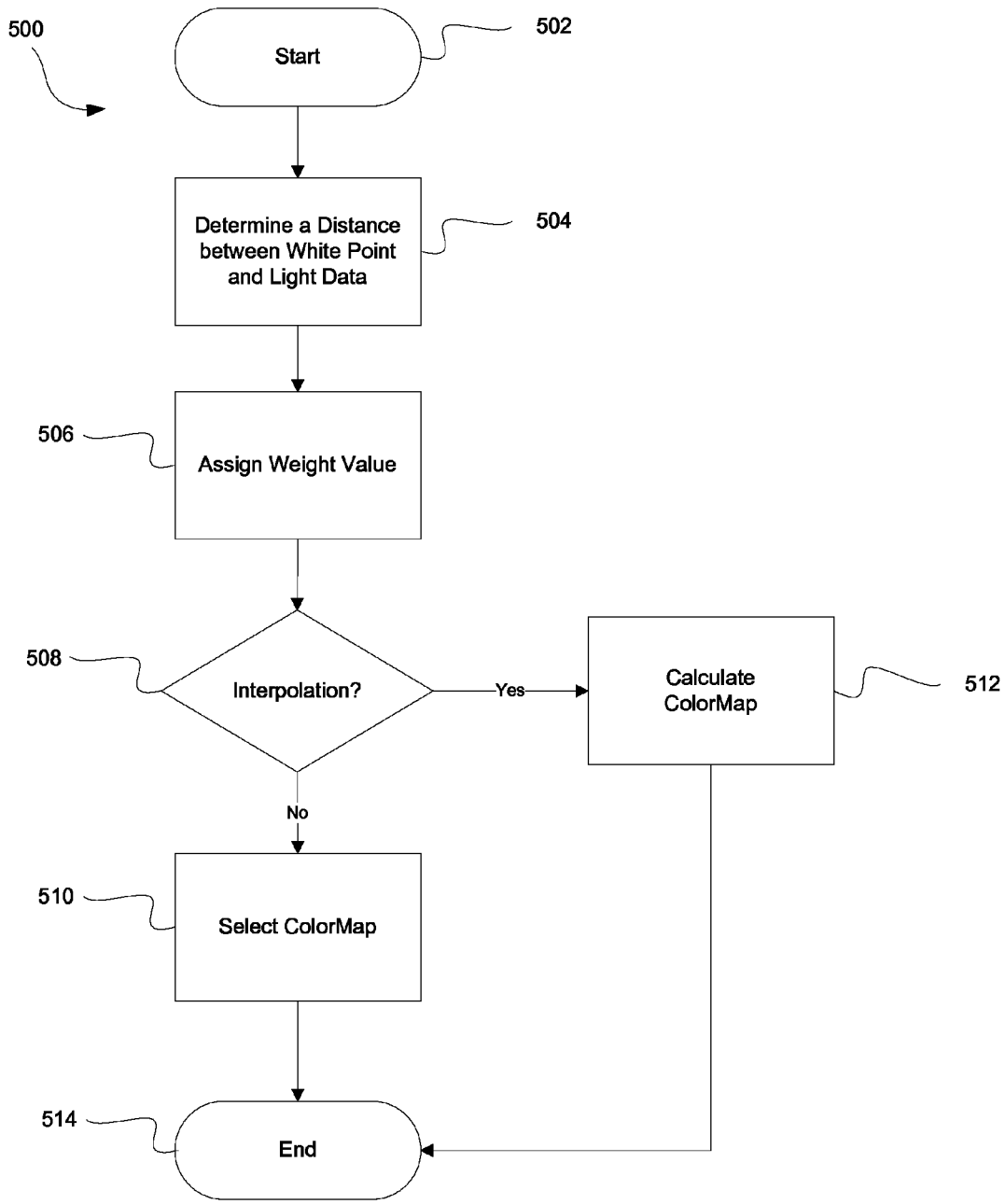
FIG. 5 is a flowchart illustrating a method of determining a colormap for colorspace conversion, in accordance with various embodiments.

Referring to FIG. 3, a method of colorspace conversion is illustrated in accordance with various embodiments. With reference to FIGS. 4 and 5, examples of determining an appropriate colormap are illustrated in accordance with various embodiments. The example processes 300, 400, and 500 of FIGS. 3, 4, and 5, respectively, may be implemented as machine-accessible or computer-readable instructions utilizing any of many different programming codes stored on any combination of computer-readable medias such as, but not limited to, a volatile or nonvolatile memory or other mass storage device (e.g., a floppy disk, a CD, and a DVD). For example, the computer-readable instructions may be embodied in a computer-readable medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Further, although a particular order of actions is illustrated in FIGS. 3, 4, and 5, these actions may be performed in other temporal sequences. Again, the example processes 300, 400, and 500 are merely provided and described in conjunction with the apparatus of FIGS. 1 and 2 as an example of one way to configure an imaging device to perform a colorspace conversion. The methods and apparatus described herein are not limited in this regard.

In the example of FIG. 3, the process 300 may begin at 302 with the print device receiving light data at 304. In various embodiments, light data may include information that pertains to an ambient light condition, for example, a measured illuminant. In one embodiment the measured illuminant may be a tristimulus value or may include one or more tristimulus coordinates. The light data may be received from one or more sources. For example, the light data may be received from a light sensor communicatively coupled to the print device, or alternatively, the light data may be received by manual input from a user of the device.

Based on the received light data, the print device may determine a colormap at 306 to be used for colorspace conversion. The colormap may be configured to compensate for an ambient light condition or other environmental characteristics. In various embodiments that will be discussed further herein with reference to FIGS. 4 and 5, the determination may be based on one of colormap translation, colormap indexing, and colormap interpolation.

At block 308, a print device may convert a received input colorspace into an output colorspace based on the determined colormap from block 306. In various embodiments, the input colorspace may be associated with data to be output by the print device. For example, in one embodiment, the data to be output may be an image and the input colorspace may define the image in varying amounts of Red, Green, and Blue (RGB). The output colorspace may be a Cyan, Magenta, Yellow, Black (CMYK) colorspace. The conversion from an input colorspace to an output colorspace may also include compensation for environmental characteristics, such as ambient light.

In various embodiments, based on the output colorspace, the data may be passed to a print pipeline and output from the print device. The process may then end, or repeat for more data at 310.

Referring to FIG. 4, a process of determining a colormap is illustrated in further detail. In accordance with various embodiments, FIG. 4 illustrates a colormap translation process. Colormap translation may incorporate the measured illuminant or light data into an effective colormap used by a print device and print pipeline. For example, a measured illuminant may be used as a white point for the effective colormap, and one or more colormap entries of a default colormap stored in memory may be shifted in proportion to a difference between the new white point and the original white point of the default colormap. For example, a measured illuminant may be expressed as a tristimulus coordinate, $(X_{ill}, Y_{ill}, Z_{ill})$. This may be used as the new white point for the effective colormap. In the exemplary embodiment, one or more colormap entries may then be shifted in proportion to the difference between this new white point and the original input value, $(X_{wh,in}, Y_{wh,in}, Z_{wh,in})$. In various embodiments, the colormap entry shift may be calculated according to equation 1, the invention is not to be limited in this regard.

$$\text{Cmap}_{out}[i,j,k] = \text{Cmap}_{in}[i,j,k] + a_{i,j,k}((X_{ill} - X_{wh,in}), (Y_{ill} - Y_{wh,in}), (Z_{ill} - Z_{wh,in})), \quad \text{Eq. 1:}$$

where $a_{i,j,k}$ is a constant specifying the proportion of the white point shift applied to colormap entry $\text{Cmap}_{in}[i, j, k]$. Those of ordinary skill in the art, based on the disclosure and teachings provided herein, will readily understand that other methods of performing colormap translations, including other algorithms, may also be used. For example, other methods may convert the colorspace into a cone response domain before performing the white point translation, and back to the target colorspace after the translation is completed. The disclosure is not to be limited to a specific algorithm.

With reference to FIG. 4, the process 400 may be utilized to determine a colormap as noted at 306 of FIG. 3. In various embodiments, a print device may compare at 404 a white point of an illuminant value received in the light data with a white point of a default colormap stored in memory. The comparison may facilitate a determination of an adjustment factor at 406. Proceeding to 408, a print device may then generate an effective colormap by adjusting one or more entries of the default colormap with the adjustment factor. The process may then end at 410 and return to execution of the process of FIG. 3 at 308.

With reference to FIG. 5, two processes of determining a colormap are illustrated in accordance with various embodiments. The two processes may be colormap indexing and colormap interpolation.

In various embodiments, colormap indexing may utilize a plurality of pre-generated colormaps stored in memory. The pre-generated colormaps may each be generated with a distinct illuminant. Colormap indexing may weigh each pre-generated colormap based on a distance between the white point of each pre-generated colormap and the light data or illuminant sensor measurement. For example, using this process, the weight of the $n^{th}$ stored colormap, $W_n$, may be equal to the inverse of the Pythagorean distance between the measured illuminant $(X_{ill}, Y_{ill}, Z_{ill})$, and the pre-generated colormap white point $(X_{wh,in}, Y_{wh,in}, Z_{wh,in})$. In various embodiments, the weights for each of the pre-generated colormaps may be calculated in accordance with Equation 2.

$$W_n = \frac{1}{\sqrt{(X_{ill} - X_{wh,in,n})^2 + (Y_{ill} - Y_{wh,in,n})^2 + (Z_{ill} - Z_{wh,in,n})^2}} \quad \text{Eq. 2}$$

The effective colormap may then be selected based on the plurality of weights. In one embodiment, the colormap with the highest weight may be selected as the colormap.

In various other embodiments, colormap interpolation may be used to determine an effective colormap. Colormap interpolation may be the most involved and robust process for utilizing ambient light measurements in the outputting process. Interpolation between entries in multiple stored colormaps, each corresponding to a specific illuminant, may increase precision of light compensation. Interpolation takes the illuminant light sensor measurement as an input and uses it to weigh the values from each of a plurality of pre-generated colormaps. These weights may be calculated as described above with reference to Equation 2. All the weights may then be normalized so that they sum to one. Each entry in the effective colormap may then be obtained by calculating a linear combination of all weighted input colormap values, for example as illustrated in Equation 3.

$$\text{Cmap}_{out}[i,j,k] = W_{norm,1}\text{Cmap}_{in,1}[i,j,k] + \ldots + W_{norm,n}\text{Cmap}_{in,n}[i,j,k] \quad \text{Eq. 3:}$$

In various embodiments, a user may press a button to capture a current illuminant state, which may add predictability to the system when interpolation is used. This captured illuminant state could be stored in memory such as memory 202. Alternatively, if the state is not captured by a user pressing a button, then the illuminant may be sampled at some rate, for example, once per second. The invention is not to be limited in this regard.

With reference to FIG. 5, a process 500 may begin at 502 when a print device or imaging device performs a process as illustrated in FIG. 3 at 306. In various embodiments, a print device may determine at 504 a distance between a measured illuminant that may be used as a new white point and each white point of a plurality of pre-generated colormaps. Each of the colormaps may have been pre-generated with different illuminant values. At 506, a print device may assign a weight value to each of the one or more of the pre-generated colormaps. The print device may then make a decision at 508 whether to utilize a colormap indexing method or a colormap interpolation method. In various embodiments, this decision may be based upon a level of precision desired by a user, an amount of computational processing ability currently available to processing core of the print device, or alternatively, an amount of time available. The invention is not to be limited in this regard.

Referring still to FIG. 5, if the print device does not decide to utilize interpolation, the print device may proceed to 510 and select an effective colormap for use for conversion of the input colorspace. The selected effective colormap may be the colormap having the highest weight out of the plurality of pre-generated colormaps. In alternative embodiments, the effective colormap may be selected based upon other criteria. Returning to 508, if the print device decided to use an interpolation process, the print device may continue to 512 where the print device may generate a colormap by calculating a linear combination of the weight value for each of the plurality of pre-generated colormaps in accordance with Equation 3. Upon selecting or calculating a colormap at 510 and at 512, respectively, the process may end at 514 and return to the process described with reference to FIG. 3. In various embodiments, the colormap may be utilized to convert the input colorspace into an output colorspace.

While various processes have been described to determine, generate, or select a colormap, referring to FIGS. 4 and 5, it is to be understood that one or more of the described processes may be available to a print device. Additionally, that selection of a colormap determination process may be based upon multiple factors including precision of output, degree of ambient light compensation required, timing, etc. Those of ordinary skill in the art will readily understand that combinations of such processes may be used without deviating from the scope of the disclosure.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A method for converting, by an imaging device, an input colorspace associated with an image into an output colorspace associated with the image, wherein the imaging device is situated in an ambient lighting condition, the method comprising:
  receiving, by the imaging device, light data, wherein the light data includes information that pertains to the ambient light condition surrounding the imaging device;
  comparing a white point of a first colormap with the light data;
  based on comparing the white point of the first colormap with the light data, determining an adjustment factor;
  adjusting, based on the adjustment factor, a plurality of entries of the first colormap to generate a second colormap; and
  based on the second colormap, converting, by the imaging device, the input colorspace associated with the image into the output colorspace associated with the image,
  wherein comparing the white point of the first colormap with the light data comprises comparing the white point of the first colormap with an illuminant value of the light data to determine a difference between (i) the white point of the first colormap and (ii) the illuminant value of the light data, and
  wherein determining the adjustment factor further comprises based on the difference between (i) the white point of the first colormap and (ii) the illuminant value of the light data, determining the adjustment factor.

2. The method of claim 1, wherein:
  the illuminant value of the light data comprises first tristimulus coordinates that; and
  the first tristimulus coordinates form a white point of the second colormap.

3. The method of claim 1, wherein:
  the illuminant value of the light data represents a white point viewed in the ambient light condition.

4. The method of claim 1, wherein the light data is received from one of (i) a light sensor or (ii) a user of the imaging device.

5. The method of claim 1, further comprises:
  outputting, by the imaging device, the data associated with the output colorspace.

6. The method of claim 1, wherein adjusting the plurality of entries of the first colormap to generate the second colormap further comprises:
  shifting a first entry of the plurality of entries of the first colormap by the adjustment factor to generate a first entry of a plurality of entries of the second colormap.

7. The method of claim 1, wherein adjusting the plurality of entries of the first colormap to generate the second colormap further comprises:
  shifting one of the plurality of entries of the first colormap by the adjustment factor to generate a corresponding entry of a plurality of entries of the second colormap.

8. The method of claim 1, wherein the imaging device is one of a facsimile machine, a printer, a scanner, a digital camera, a handheld computing device, a Liquid Crystal Display, a display, or a multi-functional peripheral.

9. An imaging device comprising:
  a light sensor configured to detect an ambient light condition surrounding the imaging device and generate light data, wherein the light data pertains to the ambient light condition surrounding the imaging device;
  a memory configured to store a first colormap;
  a colormap compensation unit configured to
    compare a white point of the first colormap with the light data,
    based on comparing the white point of the first colormap with the light data, determine an adjustment factor, and
    based on the adjustment factor, adjust a plurality of entries of the first colormap to generate a second colormap; and
  a pipeline configured to, based on the second colormap, convert an input colorspace associated with an image into an output colorspace associated with an image,
  wherein the colormap compensation unit is further configured to
    compare the white point of the first colormap with the light data by comparing the white point of the first colormap with an illuminant value of the light data to determine a difference between (i) the white point of the first colormap and (ii) the illuminant value of the light data, and
    based on the difference between (i) the white point of the first colormap and (ii) the illuminant value of the light data, determine the adjustment factor.

10. The imaging device of claim 9, wherein:
  the illuminant value of the light data comprises first tristimulus coordinates; and
  the first tristimulus coordinates form a white point of the second colormap.

11. The imaging device of claim 9, wherein:
  the illuminant value of the light data represents a white point viewed in the ambient light condition.

12. The imaging device of claim 9, wherein the imaging device is configured to output the data associated with the output colorspace.

13. The imaging device of claim 9, wherein the colormap compensation unit is configured to adjust the plurality of entries of the first colormap to generate the second colormap by:
  shifting a first entry of the plurality of entries of the first colormap by the adjustment factor to generate a first entry of a plurality of entries of the second colormap.

14. The imaging device of claim 9, wherein the colormap compensation unit is configured to adjust the plurality of entries of the first colormap to generate the second colormap by:
  shifting one of the plurality of entries of the first colormap by the adjustment factor to generate a corresponding entry of a plurality of entries of the second colormap.

15. The imaging device of claim 9, wherein the light data is a first light data, the imaging device further comprising:
  an interface configured to receive second light data input by a user of the imaging device.

16. The imaging device of claim 9, wherein the imaging device is one of a facsimile machine, a printer, a scanner, a digital camera, a handheld computing device, a Liquid Crystal Display, a display, and a multi-functional peripheral.

* * * * *